US008442956B2

(12) United States Patent
Tofano (10) Patent No.: US 8,442,956 B2
(45) Date of Patent: May 14, 2013

(54) SAMPLING BASED DATA DE-DUPLICATION (75) Inventor: Jeffrey Vincent Tofano, San Jose, CA (US)

(73) Assignee: Wells Fargo Capital Finance, LLC, Santa Monica, CA (US)

( * ) Notice: Subject to any disclaimer, the term of this patent is extended or adjusted under 35 U.S.C. 154(b) by 0 days.

(21) Appl. No.: 13/351,192

(22) Filed: Jan. 16, 2012

(65) Prior Publication Data
US 2012/0233135 A1 Sep. 13, 2012

(51) Int. Cl.
*G06F 17/30* (2006.01)
(52) U.S. Cl.
USPC .......................................... 707/692
(58) Field of Classification Search .................. None
See application file for complete search history.

(56) References Cited

U.S. PATENT DOCUMENTS

| | | |
|---|---|---|
| 2007/0255758 A1 | 11/2007 | Zheng et al. |
| 2008/0301134 A1 | 12/2008 | Miller et al. |
| 2010/0250501 A1* | 9/2010 | Mandagere et al. ........... 707/692 |
| 2010/0306412 A1* | 12/2010 | Therrien et al. .............. 709/247 |
| 2011/0040951 A1* | 2/2011 | Akirav et al. ..................... 712/4 |
| 2012/0124307 A1* | 5/2012 | Ashutosh et al. ............. 711/162 |
| 2012/0143715 A1* | 6/2012 | Eshghi et al. ................ 705/26.3 |
| 2012/0166401 A1* | 6/2012 | Li et al. .......................... 707/692 |

FOREIGN PATENT DOCUMENTS

EP 2256934 1/2010

OTHER PUBLICATIONS

Combined Search and Examination Report dated Feb. 11, 2011 and issued in connection with corresponding patent application No. 1100754.9 in Great Britain.
"Sparse Indexing: Large Scale, Incline Deduplicaiton Using Sampling and Locality," Lillibridge et al., 2009, Proceedings of $7^{th}$ USENIX Conference on file and Storage Technologies, pp. 111-123.
"PeerDedupe: Insights into the Peer-assisted Sampling Deduplication," Xing et al., Aug. 2010, Department of Computer Science and Technology, Peking Univeristy, China; 2010 IEEE P2P Proceedings; pp. 1-10.

* cited by examiner

*Primary Examiner* — Neveen Abel Jalil
*Assistant Examiner* — Kevin L Young
(74) *Attorney, Agent, or Firm* — Ladas & Parry, LLP (57) ABSTRACT Example apparatus, methods, and computers perform sampling based data de-duplication. One example method controls a data de-duplication computer to compute a sampling sequence for a sub-block of data and to use the sampling sequence to locate a stored sub-block known to the data de-duplication computer. Upon finding a stored sub-block to compare to, the method includes controlling the data de-duplication computer to determine a degree of similarity (e.g., duplicate, very similar, somewhat similar, very dissimilar, completely dissimilar, x % similar) between the sub-block and the stored sub-block and to control whether and how the sub-block is stored and/or transmitted based on the degree of similarity. The degree of similarity can also control whether and how the data de-duplication computer updates a dedupe data structure(s) that stores information for finding groups of similarity sampling sequence related sub-blocks.

12 Claims, 7 Drawing Sheets

SAMPLING BASED DATA DE-DUPLICATION

CROSS-REFERENCE TO RELATED APPLICATIONS

This application claims priority to British Patent Application No. 1100754.9 filed on Jan. 17, 2011, the disclosure of which is hereby incorporated by reference in its entirety.

BACKGROUND

Conventional hash based de-duplication is based on making a binary duplicate/unique decision for a sub-block in one logical step using a hash-based index. A sub-block of data to be analyzed is hashed and the hash is used to either find the duplicate stored block of data or to determine that the block is not a duplicate. This conventional hash based de-duplication addresses the facts that: storing data takes time and space; transmitting data takes time and bandwidth; and both storing data and transmitting data cost money. Yet more data to be stored and/or transmitted is constantly being generated. The rate at which the amount of data is expanding may be exceeding the rate at which storage space and transmission bandwidth are growing. Furthermore, while the amount of data to be stored and/or transmitted is growing, the amount of time available to store and/or transmit data remains constant. Therefore, efforts including the hash-based data de-duplication have been made to reduce the time, space, and bandwidth required to store and/or transmit data. Data de-duplication may be referred to as "dedupe".

Conventional dedupe has included chunking a larger data item (e.g., object, file) into sub-blocks and processing hashes of the sub-blocks. Chunking includes selecting boundary locations for fixed and/or variable length sub-blocks while hashing includes computing a hash of the resulting chunk. A chunk may also be referred to as a sub-block. Comparing relatively smaller hashes (e.g., 128 bit cryptographic hash) can be more efficient than comparing relatively larger chunks (e.g., 1 kB, 128 kB, 1 MB) of data using a byte-by-byte approach. Therefore, conventional data reduction involved chunking larger pieces of data into smaller chunks, computing fingerprints (e.g., hashes) for the smaller chunks, and then comparing fingerprints of the smaller chunks so that duplicate chunks did not have to be stored. The fingerprints were compared to fingerprints of known, stored sub-blocks to determine whether the chunk was unique and should be stored and indexed or whether the chunk was a duplicate and could be accounted for without storing and indexing. Fingerprints were even transmitted between computers in lieu of actual sub-blocks or blocks to reduce bandwidth consumption.

Conventionally, after boundaries for a chunk were placed, the data between the boundaries was hashed, often with a strong cryptographic hash. The hash was then used both to identify the chunk and to determine whether the chunk was a duplicate of an already stored chunk. Unique chunks were stored and index entries were updated to record the fact that the sub-block became known, that its hash had been stored, and that the actual storage location of the physical sub-block became known and available. Dedupe based on absolute uniqueness as determined by strong cryptographic hashes provides benefits for data reduction but may become expensive and infeasible with respect to data structure storage space and processing time.

Comparing fingerprints is facilitated by indexing the fingerprints to facilitate retrieval, comparison, and searching. Dedupe indexes and other dedupe data structures have traditionally been populated with data that facilitated storing unique chunks, locating unique chunks, and making duplicate determinations. The traditional dedupe index has maintained a one-to-one relationship between unique chunks and their hashes and related data. Over time, as the amount of indexed data has grown, conventional hash based processing and indexing have experienced challenges with respect to processing time and storage size. An index may grow so large that it is infeasible and/or impossible to hold it in the memory of a computer. Thus, conventional dedupe may suffer significant time delays when even a portion of the index is stored on disk instead of in memory. Additionally, when the index grows, it becomes increasingly difficult, or impossible, to distribute the index across collaborating nodes. These challenges were previously unknown since indexes and stored data sets of the size, nature, and complexity of those processed by de-duplication applications were unknown.

BRIEF DESCRIPTION OF THE DRAWINGS

The accompanying drawings, which are incorporated in and constitute a part of the specification, illustrate various example methods, apparatuses, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example sampling based de-duplication is based on making a similarity decision for a sub-block in multiple logical steps using a sampling sequence based data structure (e.g., index) to find entry points to other data structures or collections of sub-blocks. While a conventional hash-based index provides a binary yes/no answer, the sampling sequence based approach provides "clues" to locations where, if the clues are followed, sub-blocks upon which the similarity decision can be made can be found. The similarity decision may decide how similar (e.g., unique/duplicate/similar) the sub-block is to another sub-block(s). Example systems and methods use configurable, adaptable, similarity sampling sequences (SSS) to identify the degree of similarity between blocks.

Sampling refers to analyzing a relatively smaller subset of a relatively larger set of data. For example, given a relatively larger block of data (e.g., 64 kB), a relatively smaller number of locations (e.g., 16) may be "sampled". Data from the locations may be compared to similarly sampled data from previously encountered sub-blocks to determine how similar, if at all, this sub-block is to some other sub-block as measured by matches between the data acquired from the sampling locations. While a sample is described, one skilled in the art will appreciate that the "sample" may also take the form of a specially constructed weak hash.

This is a fundamentally different approach to dedupe, an approach that no longer relies primarily and/or initially on cryptographic hashes to identify and/or locate unique and/or duplicate sub-blocks. Instead, example systems and methods rely on similarity sampling sequences (SSS) to identify and/or characterize sub-blocks and then engage in multi-tier probability based processing controlled initially by the SSS. In one example, the SSS may be a specially constructed weak hash. The multi-tier probability based processing may yield decisions including, but not limited to, that the sub-block is a duplicate to a previously encountered sub-block and should not be stored, that the sub-block is a unique sub-block and should be stored in its entirety, that the sub-block is a unique sub-block but is so similar to another sub-block that it should be stored as a set of differences (e.g., delta chunk) from the other sub-block, and that the sub-block is so similar to an already stored sub-block that it shouldn't be stored at all and that the similar sub-block should be used instead. The final decision may make sense for certain types of data (e.g., voice, video, music) where a certain number of errors or differences can be tolerated. For example, if a 64-bit color code for a pixel is off by one bit the difference in the resulting color may be so subtle that it would not be noticed and is acceptable for some applications like displaying real-time video on anything less than a high definition television (HDTV), for example, a real-time display on a cellular telephone. Similarly, a one bit difference in a voice file may be irrelevant to understanding the voice file.

The SSS may also identify known sub-blocks that are likely similar to a sub-block being processed (e.g., ingested) and a degree of similarity (e.g., duplicate, very similar, somewhat similar, very dissimilar, completely dissimilar) between likely similar sub-blocks. Similarity sampling sequences replace hashes as the initial and/or primary identifier for a sub-block because the uniqueness of a sub-block may not be its most important attribute for dedupe. Instead, the probability that a sub-block is similar to some other sub-block to within a threshold may be a more important attribute for dedupe, including index size control. Additionally, using a sampling sequence eliminates the possibility of a cryptographic hash collision. Similarity between sub-blocks may be described according to whether the two sub-blocks are similar to within a threshold. A threshold may describe how many characters can be different, a percentage of characters that can be different, how distributed the different characters can be, and so on. For example, a first threshold may be satisfied if two sub-blocks have less than three different characters. A second threshold may be satisfied if two sub-blocks have up to ten different characters, but they are contiguous. One skilled in the art will appreciate that other thresholds can be employed.

Conventionally, a hash function considers every unit of data (e.g., bit, byte, character) in a chunk when computing a hash. This is necessary to support exact uniqueness determinations. However, even with a wide cryptographic hash, a hash collision can still occur. When similarity is considered instead of uniqueness, all-inclusive sub-block wide hashes may no longer be processed. Instead, a chunk may be sampled at a number of locations and the sample results compared to determine how likely it is that a sub-block being processed is similar to other known chunks to within a certain degree. Two chunks that differ in only one location will produce two different hashes. However, two chunks that differ in only one location may produce matching or related SSS. Recall that the "sample" may be a specially constructed weak hash that touches fewer data locations than a wide cryptographic hash. Since the sampling sequence does not touch every byte like the cryptographic hash approach, a sampling sequence approach may provide performance improvements over conventional systems.

Figure 1:
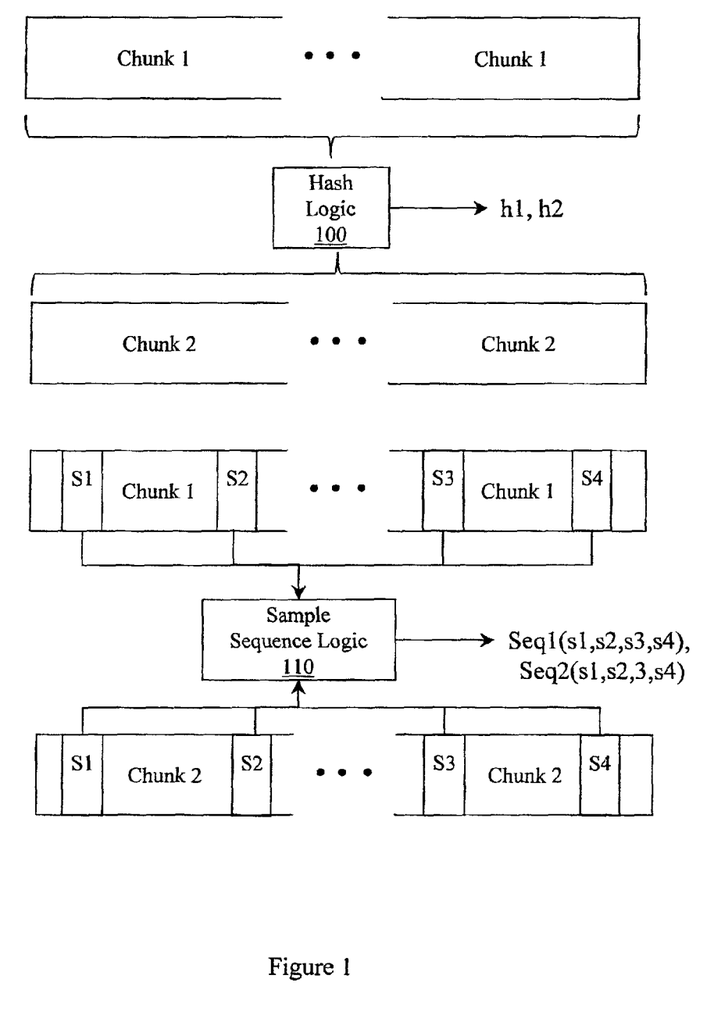
FIG. 1 illustrates taking a hash of a chunks) and sampling a chunk(s).

FIG. 1 illustrates taking a hash of a chunk and sampling a chunk. Conventionally, a hash logic 100 would consider the entire contents of chunk1 and chunk2 and produce hashes h1 and h2. Hashes h1 and h2 may be, for example, 128 bit cryptographic hashes computed from the entire contents of their respective chunks. Hashes h1 and h2 would then be compared to determine whether chunk1 and chunk2 were identical chunks. Knowing whether chunks are identical is useful for exact duplicate processing. However, exact duplicate processing may lead to challenging data structures.

Example systems and methods instead use a sample sequence logic 110 to sample chunk1 and chunk2. Chunk1 and chunk2 can be sampled at a number of sample locations (e.g., s1, s2, s3, s4) and the sample values aggregated into, for example, Seq1(s1,s2,s3,s4) from chunk1 and Seq2(s1,s2,s3,s4) from chunk2. Seq1(s1,s2,s3,s4) and Seq2(s1,s2,s3,s4) may be, for example, 32 bits that represent four one byte sample locations, one each from s1, s2, s3, and s4. While four 8-bit samples are described, one skilled in the art will appreciate that different numbers of sample locations having different sizes and positioned at different locations may be employed. Additionally, the sample sequence logic 110 may compute a specially constructed weak hash from a number of sample locations. The chunks can then be compared based on the sample sequences. While the sample sequences cannot determine that two chunks are identical, the sample sequences can determine that two chunks are different. Furthermore, a probability of the degree of similarity between the two chunks can be computed based on relationships between sampling sequences.

Consider a 64 kB block. A conventional system might compute a 128-bit cryptographic for the block that could uniquely identify the block and allow exact duplicate determinations to be made based on the hash. While this binary unique/duplicate decision is very powerful, it is also expensive and limiting because it says nothing about how unique or how similar the sub-block is in relation to other sub-blocks. The 128 bit hash computation would typically consider every one of the 64 k bytes. Example systems and methods will instead sample the block at a small number (e.g., 8, 64) locations to produce a sample sequence. The sample sequence can then be examined in light of other stored sample sequences to determine uniqueness and similarity. By way of illustration, if 64 locations are sampled, and there are 64 matches between the sample sequence and another sample sequence, then it is likely that there are also other matches between the sub-blocks associated with the sequences because it is unlikely that 64 out of 64 sample locations could match without there being some relationship between the two blocks. In this case, a second step may involve computing the cryptographic hash and accessing a cryptographic hash index because the 64 out of 64 SSS match makes it likely the block is a known duplicate. An alternate second step may involve doing byte wise comparisons starting at each of the sampling locations and moving outwards in one or both directions from those points to determine whether the blocks match. Other second and subsequent steps may also be taken.

Conversely, if there is even one mismatch in the 64 sample locations, then the chunk is quickly identified as not being a duplicate. In this case there would be no point in computing a cryptographic hash. But rather than stopping with a binary unique/duplicate decision, example systems and methods probe further to determine degrees of similarity that support other, more sophisticated decisions that can, in some cases, be performed in parallel. For example, byte wise comparisons starting at the matching points and moving outwards may be warranted. If there are x matching locations, then 2× bytewise comparisons could proceed in parallel starting at the matching locations and moving outwards in both directions. In another example, the larger bock may be sampled at additional locations, may be broken into smaller blocks that can be sampled or hashed, or may be processed using other techniques.

As the number of matches between sampling points in two chunks increases the likelihood that the two chunks are duplicates and/or similar increases. Conversely, as the number of matches decreases, the likelihood that the two chunks are closely related decreases. For example, if two similarity sampling sequences match in n out of n locations, then there is a first probability that the sub-blocks associated with the similarity sampling sequences have a degree of similarity that exceeds a threshold (e.g., 50% or more duplicate data). But if the two similarity sampling sequences only match in n/2 out of n locations, then there is a second, lower probability that the sub-blocks associated with the similarity sampling sequences have a degree of similarity that exceeds the threshold. The probability that two sub-blocks are similar to beyond a threshold motivates multi-tier processing to make duplicate/unique/similar determinations in parallel. Different types of multi-tier processing may be selected based, for example, on the number of matching points in the sampling sequence.

Comparing a sample sequence to every other sample sequence is computationally and algorithmically similar to comparing a hash to every other hash, however the comparison occurs in a much more constrained space. The maximum number of stored similarity sampling sequences is defined by the length of the sequence and the number of characters in the alphabet. If there are 128 possible symbols and 8 sample locations, there are at most 128×8 sequences ($2^7 \times 2^3 = 2^{10}$). Conversely, for a 128 bit hash, the matching space is defined by $2^{128}$ entries. While $2^{10}$ similarity sampling sequences are readily stored in an index that can be stored in memory, those $2^{10}$ similarity sampling sequences do not provide definite duplicate decisions. Instead, the similarity sampling sequences identify the sub-block(s) with which the sub-block being processed has the most similarity sampling sequence based affinity. While it is possible that two sub-blocks only match on data in sampled locations, this is unlikely. Sub-blocks that match on a large number of sample points tend to match on non-sample points and sub-blocks that do not match on sample points tend to not match on non-sample points. Relationships between the probabilities of matching and the degree of similarity can be established for different data sets having different entropy. Entropy is a measure of uncertainty associated with the randomness of data in an object to be data reduced. The entropy of data that is truly random is one. The entropy of a long string of duplicate characters is nearly zero. The entropy of most data falls between these two limiting examples.

Figure 2:
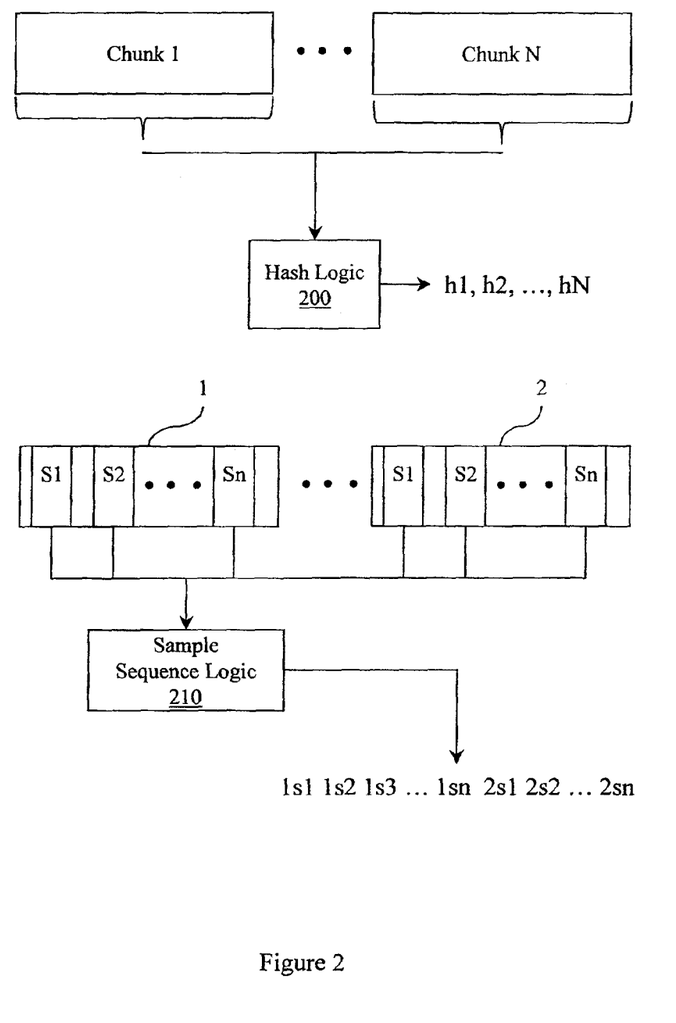
FIG. 2 illustrates taking hashes of chunks and sampling chunks.

While FIG. 1 illustrates a single sequence from a single chunk, example systems and methods may aggregate sequences from multiple chunks before deciding on similarity. Therefore, FIG. 2 illustrates taking hashes of chunks and sampling chunks. An object (e.g., file) may be chunked into several chunks (e.g., chunk 1 . . . chunk N). Conventionally, hash logic 200 would produce an individual hash (e.g., h1, h2, . . . hN) for each chunk. The individual hashes would then be compared against indexed hashes to make duplicate determinations. A "duplicate determination" identifies whether a first sub-block being processed is a duplicate of a second sub-block. The first sub-block may be, for example, a block that is being ingested and the second sub-block may be a member of a set of stored sub-blocks. In addition to comparing hashes for individual chunks, sets of hashes may be compared to find larger duplicates. For example, if all the hashes for an object (e.g., file) are matched by hashes associated with already known and stored sub-blocks, then the entire object may be a duplicate and single instancing may be appropriate.

Example systems and methods may aggregate similarity sampling sequences to facilitate identifying similarities for objects larger than an individual chunk. Sample sequence logic 210 may produce an SSS for chunk 1 (e.g., $1s1\ 1s2\ 1s3\ \ldots\ 1sn$) and may produce an SSS for chunk 2 (e.g., $2s1\ 2s2\ 2s3\ \ldots\ 2sn$). Example systems and methods may aggregate the two SSS into a single larger SSS (e.g., $1s1\ 1s2\ 1s3\ \ldots\ 1sn\ 2s1\ 2s2\ 2s3\ \ldots\ 2sn$). The aggregate may then be analyzed to find similarity starting points upon which higher-level (e.g., object, file) similarity and/or duplicate determinations can be made. Additionally, storage, indexing, and other processing can be controlled based on the degree of similarity between aggregations of similarity sampling sequences.

Example systems and methods may employ multi-tier processing to limit the size of the index and to facilitate parallel processing. The multi-tier processing may include, for example, computing hashes of smaller portions of a sub-block, computing delta hashes for the sub-block or portions of the sub-block, computing similarity sampling sequences (SSS) for smaller portions of the sub-block, performing byte-wise comparisons for the sub-block or portions of the sub-block, and other tasks. Delta hashes are described in UK patent number 1012107-7, filed Jul. 19, 2010, by the same inventor and assigned to the same assignee. The multi-tier processing can be used to find a duplicate stored block and/or to find a similar stored block. The multi-tier processing can be used to find regions of similar and/or duplicate data and regions of dissimilar data. The multi-tier processing can provide information to facilitate determining whether to store the sub-block being processed or whether to store information on how to make the sub-block being processed from some other known sub-block.

Example systems and methods therefore produce a paradigm shift in dedupe. The paradigm shift involves seeking probabilities of similarity rather than exactness of uniqueness. Instead of determining that a sub-block being processed (e.g., ingested) is exactly the same as a known sub-block whose hash value and location information are indexed in a large one-to-one index, a first determination may be made about likely similar sub-blocks. Instead of storing information about all unique sub-blocks in one index, example systems and methods figure out how much a sub-block being processed (e.g., ingested) is like another known sub-block and what needs to be done to locate, recreate, and/or evaluate the sub-block being processed without updating the main index.

In one embodiment, the SSS can be adapted to produce a desired distribution where there are enough similarities to produce a storage reduction but not so many similarities that the multi-tier processing becomes overly burdensome and outweighs the data reduction benefit. Adaptations can include but are not limited to, changing the number of sample points, changing how many sample point sequences are aggregated together for analysis, changing the locations of sample points, changing the size of a single sample point (e.g., one bit, n bits, one byte, n bytes, . . . ), changing the specially constructed weak hash, and so on. Changing the locations of the sample points can achieve different sampling biases (e.g., front bias, end bias) where data in different localized regions is considered first and/or more thoroughly when making similarity decisions.

Figure 3:
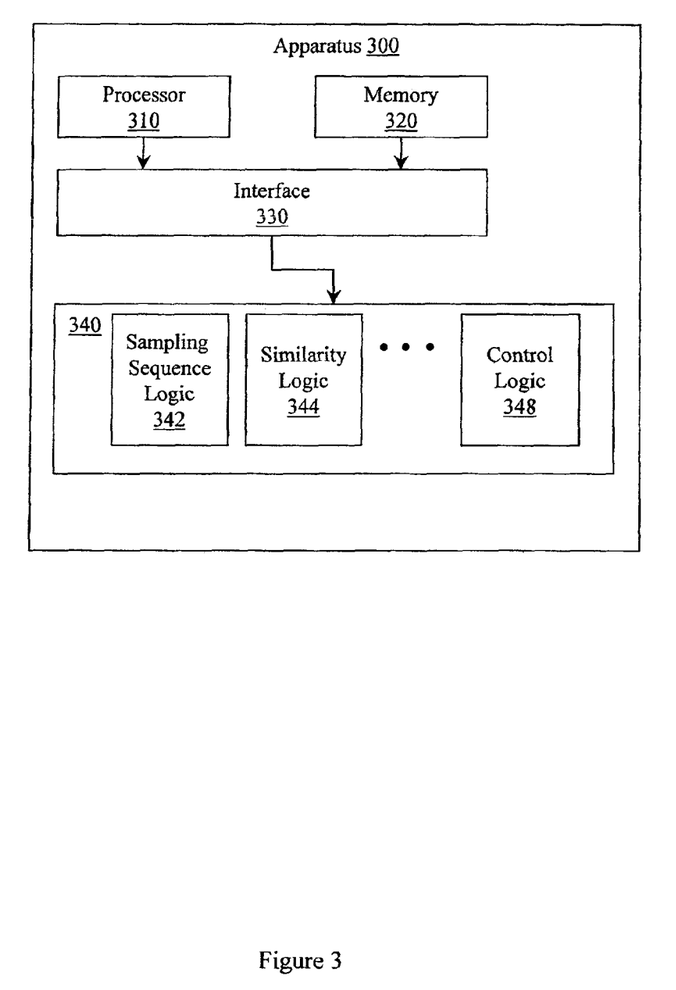
FIG. 3 illustrates an embodiment of an apparatus associated with sampling based data de-duplication.

FIG. 3 illustrates an apparatus 300. Apparatus 300 is configured to control sampling based data de-duplication. Apparatus 300 includes a processor 310, a memory 320, and an interface 330. Interface 330 connects the processor 310, the memory 320, and a set 340 of logics (e.g., 342, . . . 348). In different embodiments, the logics may be, for example, circuits, integrated circuits, application specific integrated circuits (ASICs), computer executable processes, and other entities. Apparatus 300 can be configured to control sampling based data de-duplication.

In one embodiment, the set 340 of logics includes a sampling sequence logic 342, a similarity logic 344, and a control logic 348.

The sampling sequence logic 342 is configured to produce a sampling sequence for a sub-block of data. In one example, the sampling sequence logic 342 is configured to produce the sampling sequence by aggregating data sampled from one or more sampling locations in the sub-block of data. The data samples may be one or more bits of data. Different data samples may have different bit lengths. The number of sampling locations is less than all the possible locations in the sub-block. In another example, the sampling sequence logic 342 is configured to produce the sampling sequence as a specially constructed weak hash using less than all the data in the sub-block of data.

The similarity logic 344 is configured to determine a degree of similarity between the sub-block and a previously de-duplicated sub-block. The degree of similarity is based, at least in part, on the sampling sequence. In one example, determining the degree of similarity involves locating information identifying a set of stored sub-blocks. The set of stored sub-blocks is found as a function of the sampling sequence. For example, the sampling sequence can identify an index entry, a graph node, a tree node, or other location where information about related sub-blocks can be found. Once the related sub-block(s) has been found, it can be compared to the sub-block using techniques including, but not limited to, a byte-wise comparison, additional sampling sequence comparison, delta hash comparison, and hash comparison.

The control logic 348 is configured to control whether and how the sub-block is de-duplicated based on the degree of similarity. In one example, the control logic 348 is configured to selectively control the apparatus 300 to store one or more of, the sub-block of data, and a delta chunk sufficient to recreate the sub-block of data. In addition to storing sub-blocks or other information, the control logic 348 can also control how and whether data structures are updated. For example, the control logic 348 can be configured to control the apparatus to update items including, but not limited to, a sampling sequence index, and a data structure that provides access to sampling sequence related stored sub-blocks. A sampling sequence index may be a data structure that is indexed on sampling sequences and that stores information for locating sub-blocks that are related to a sub-block having the sampling sequence associated with the index.

Example systems and methods may perform sampling based dedupe in different ways for data that is stored in different ways (e.g., archived, stored near-line, stored online). Archiving typically focuses on preserving documents or data in a form that has some sort of certifiable integrity. Archives are generally immune to unauthorized access and tampering, and can be the subject of record management operations (e.g., automatic deletion after a certain period, auditor-initiated retrieval). Archives are generally conceived to be an operational system for processing documents and/or data that are no longer in active use. Near-lining concerns holding data that is used less frequently than the most current data but that is used frequently enough that archiving may store the data too deeply. Near-line data is contrasted to online data, which will be the most currently used data. Near-line storage represents a compromise between online storage and offline storage (e.g., archive).

Figure 4:
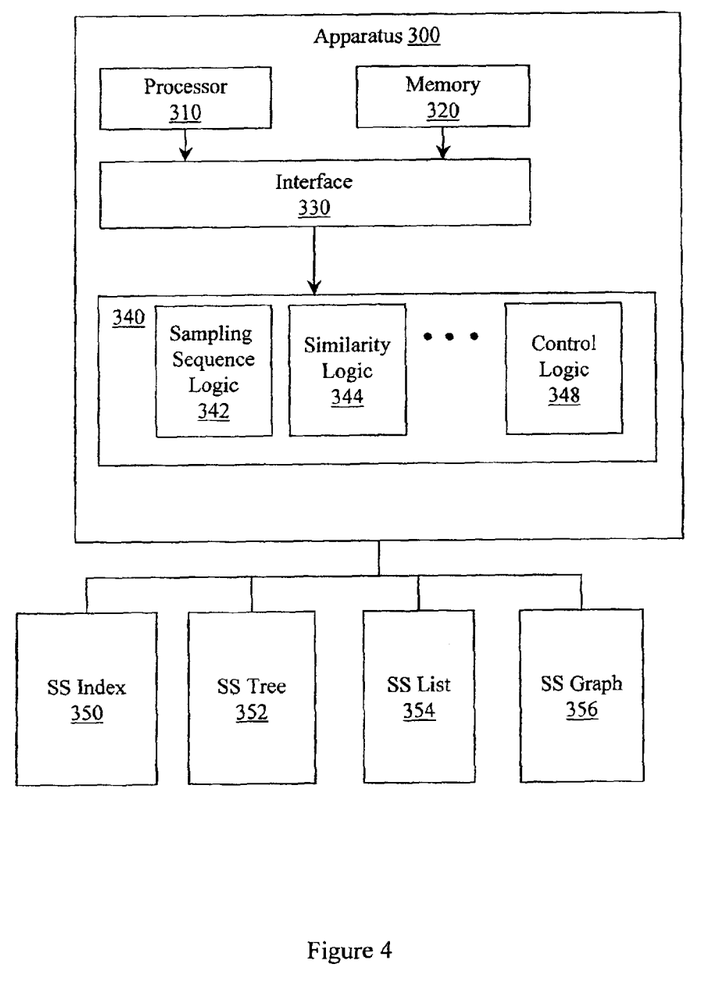
FIG. 4 illustrates an embodiment of an apparatus associated with sampling based data de-duplication.

FIG. 4 illustrates another embodiment of apparatus 300. This embodiment illustrates example data structures that may be accessed and/or maintained by apparatus 300. The data structures include a sampling sequence index 350, a sampling sequence tree 352, a sampling sequence list 354, and a sampling sequence graph 356. These data structures may provide information from which entry points can be determined. These data structures may also provide information from which unique/duplicate/similarity decisions can be made.

Example systems and methods may compare sequences of similarity sampling data from sampling locations to multiple stored similarity sampling sequences that partition the data space comprising all stored sub-blocks. Conventionally, a $2^{128}$ entry hash-based primary index partitions the data space and provides the binary unique/duplicate decision in one logical step (e.g., examine value found from hash-based index lookup). However, the size of the data structure (e.g., hash-based index) required to support this one logical step can produce several physical steps that includes, unfortunately, one or multiple disk input/output. In one example, apparatus 300 partitions the data space using more than a single data structure (e.g., hash-based index) and using more than a single logical step. Conventionally, it has been difficult, if even possible at all, to partition the index. In addition to partitioning the data space in a different way, apparatus 300 may not require exact duplication between sub-blocks to prevent storing a second sub-block. If two sub-blocks differ in less than a threshold number of locations, then apparatus 300 may instead store a delta chunk or may not store the chunk at all. Delta chunks are described in UK patent application 1012107-7, filed Jul. 19, 2010, by the same inventor and assigned to the same assignee.

Determining that one chunk is not identical to but is similar to another chunk(s) provides a starting point for retrieving, storing, or processing the chunk. That starting point may be determined without updating a primary index of stored sub-blocks (e.g., sampling sequence index 350). Instead of having an entry for every possible hash, the first data structure consulted (e.g., index) can have entries for a finite and constrained number of similarity sampling sequences. These index entries can then provide bridges or links to starting points (e.g., entry locations) for searching for sub-blocks in other finite and constrained data structures. The combination of data structures may require more processing cycles to navigate than a large single level index, however the combination of data structures may consume less memory than a conventional hash-based index and therefore may all be capable of being held in memory. Additionally, the combination of data structures may be easier to distribute between collaborating computers. Since the multi-tier processing may be performed in parallel, the extra processing cycles may be distributed over multiple processors to improve processing times for sub-blocks.

Once apparatus 300 determines a starting point for locating potentially similar and/or duplicate sub-blocks using an initial data structure (e.g., similarity sampling sequence based index), then other processing and data structures (e.g., tree 352, list 354, graph 356) can be used to find a duplicate sub-block, a sub-block that exceeds a similarity threshold, or to determine that the sub-block is not similar to within a threshold with stored sub-blocks. Therefore, apparatus 300 may perform multi-tier processing to see how similar a 64 kB block that matched on a threshold number of sample points is to some other known 64 kB block. While a 64 kB fixed size block is described, one skilled in the art will appreciate that other sized blocks can be employed. Similarly, while a fixed size block is described, one skilled in the art will appreciate that data dependent variable sized blocks are possible.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic. The physical manipulations transform electronic components and/or data representing physical entities from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 5:
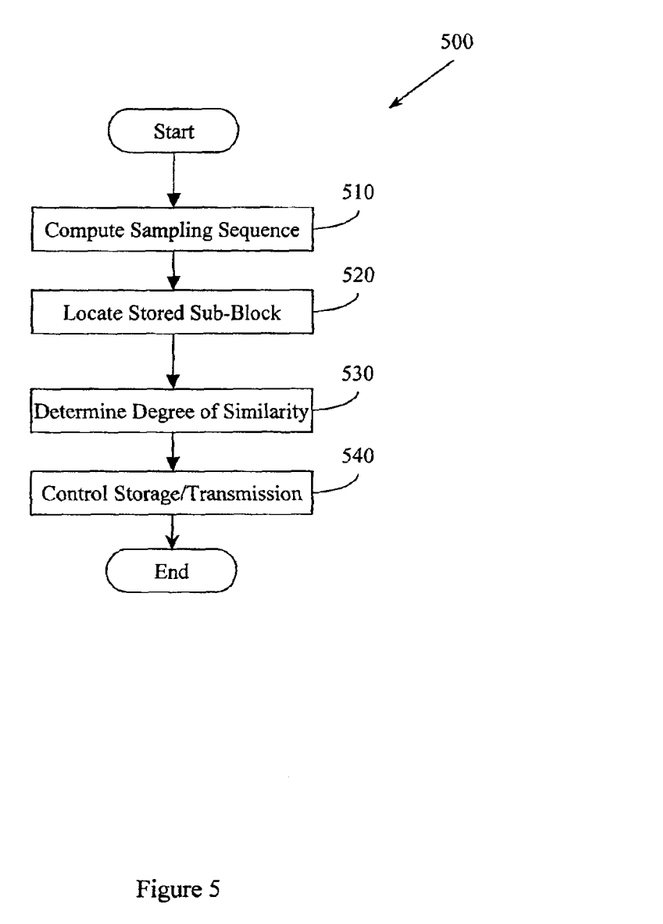
FIG. 5 illustrates an embodiment of a method associated with sampling based data de-duplication.

FIG. 5 illustrates a method 500 for controlling a data de-duplication computer to perform sampling based data de-duplication. Method 500 includes, at 510, controlling the data de-duplication computer to compute a sampling sequence for a sub-block of data. The sampling sequence is produced from one or more pieces of data selected from one or more locations in the sub-block. In one embodiment the one or more pieces of data are all the same length while in another embodiment the one or more pieces of data may have different lengths.

How the sampling sequence is produced can be altered over time and for different data sets. Therefore, method 500 can also include controlling the data de-duplication computer to select attributes including, but not limited to, a number of locations to be sampled when computing the sampling sequence, the positions of locations to be sampled when computing the sampling sequence, and the sizes of samples to be taken at locations to be sampled when computing the sampling sequence. For example, at one point in time a relatively large number of sampling locations may be employed while at a later point in time a relatively smaller number of sampling locations may be employed. The change may be based on de-duplication results observed during a time period. Alteration selections can be based on criteria including, but not limited to, whether an entropy measure associated with the sub-block exceeds an entropy threshold, whether a sub-block size associated with the sub-block exceeds a size threshold, and whether the sub-block was chunked using fixed boundaries or data dependant boundaries. By way of illustration, large chunks with low entropy may be processed with relatively large sampling sequences while small chunks with high entropy may be processed with relatively smaller sampling sequences. Conditions may change over time, therefore method 500 may include selectively dynamically altering the number of locations to be sampled when computing the sampling sequence, the positions of locations to be sampled when computing the sampling sequence, the sizes of samples taken at locations to be sampled when computing the sampling sequence, and other attributes. These alterations may also be based on different criteria (e.g., entropy, chunk size, chunk technique).

Method 500 also includes, at 520, controlling the data de-duplication computer to use the sampling sequence to locate a stored sub-block known to the data de-duplication computer. In one example, locating a stored sub-block includes locating an entry point to a set of similarity sampling sequence related sub-blocks. The entry point may be identified, for example, in a similarity sampling sequence keyed index. The entry point may also be identified, for example, in other similarity sampling sequence based data structures including, but not limited to, a similarity sampling sequence tree, a similarity sampling sequence graph, and a similarity sampling sequence list. An entry point refers to a sub-block that is related to other sub-blocks and from which other sub-blocks can be located. For example, an entry point may be an entry in a linked list, in a tree, in a graph, or in another data structure. The entry point will be associated with information that facilitates finding and/or evaluating the other related sub-blocks.

Recall that one issue with hash-based indexes and de-duplication was the overwhelming size of the primary index. Therefore, in one embodiment, a similarity sampling sequence keyed index is constrained to have a maximum size bounded by the number of locations sampled and an alphabet associated with the sub-block of data. Additionally, the size is constrained to be less than the amount of physical memory in the data de-duplication computer.

Method 500 also includes, at 530, controlling the data de-duplication computer to determine a degree of similarity between the sub-block and the stored sub-block. The degree of similarity may be determined in different ways. Different approaches are described in connection with FIG. 6.

Method 500 also includes, at 540, controlling the storage and/or transmission of the sub-block. The storage and/or transmission can be controlled based on the degree of similarity between the sub-block and one or more stored sub-blocks. The control choices available include, but are not limited to, controlling whether the data de-duplication computer stores the sub-block, controlling how the data de-duplication computer stores the sub-block, controlling whether the data de-duplication computer transmits the sub-block, and controlling how the data de-duplication computer transmits the sub-block. The control at 540 can also include controlling whether the data de-duplication computer updates a dedupe data structure and, if so, how the data de-duplication computer updates a dedupe data structure. The control can include, but is not limited to, controlling updating a sampling sequence based index that stores entry points to groups of similarity sampling sequence related stored sub-blocks, controlling updating a temporal index that stores information about known sub-blocks that are related by one or more of, arrival sequence, de-duplication sequence, and physical storage location, and controlling updating one or more of, a similarity sampling sequence based tree, a similarity sampling sequence based graph, and a similarity sampling sequence based list, where the similarity sampling sequence based data structures store one or more of, information about known similarity sampling sequence related stored blocks and entry points to groups of similarity sampling sequence related stored sub-blocks.

While a single sampling sequence is described, in different embodiments, method 500 can control the data de-duplication computer to compute a sampling sequence for two or more sub-blocks of data. The two or more sampling sequences can then be aggregated together into a single sampling sequence. When the sampling sequences are aggregated together, method 500 can include controlling the data de-duplication computer to use the aggregated sampling sequence to locate a stored sub-block known to the data de-duplication computer. Recall that the sampling sequence may be, for example, a specially constructed weak hash that uses less than all the data in a sub-block of data.

Additionally, method 500 can include controlling the data de-duplication computer to compute two or more different sampling sequences for the sub-block. Rather than aggregating the sequences together, method 500 can include controlling the data de-duplication computer to locate two or more stored sub-blocks known to the data de-duplication computer using the two or more different sampling sequences. When multiple sub-blocks are retrieved, method 500 can include controlling the data de-duplication computer to determine degrees of similarity between the sub-block and the two or more stored sub-blocks.

In different embodiments, portions of method 500 can be performed in parallel. Therefore method 500 can include controlling the data de-duplication computer to compute the two or more different sampling sequences for the sub-block at least partially in parallel, controlling the data de-duplication computer to locate the two or more stored sub-blocks at least partially in parallel, and controlling the data de-duplication computer to determine the degrees of similarity at least partially in parallel.

In one example, a method may be implemented as computer executable instructions. Thus, in one example, a non-transitory computer readable medium may store computer executable instructions that if executed by a computer (e.g., data reduction server) cause the computer to perform method 500. While executable instructions associated with the above method are described as being stored on a computer readable medium, it is to be appreciated that executable instructions associated with other example methods described herein may also be stored on a computer readable medium.

Figure 6:
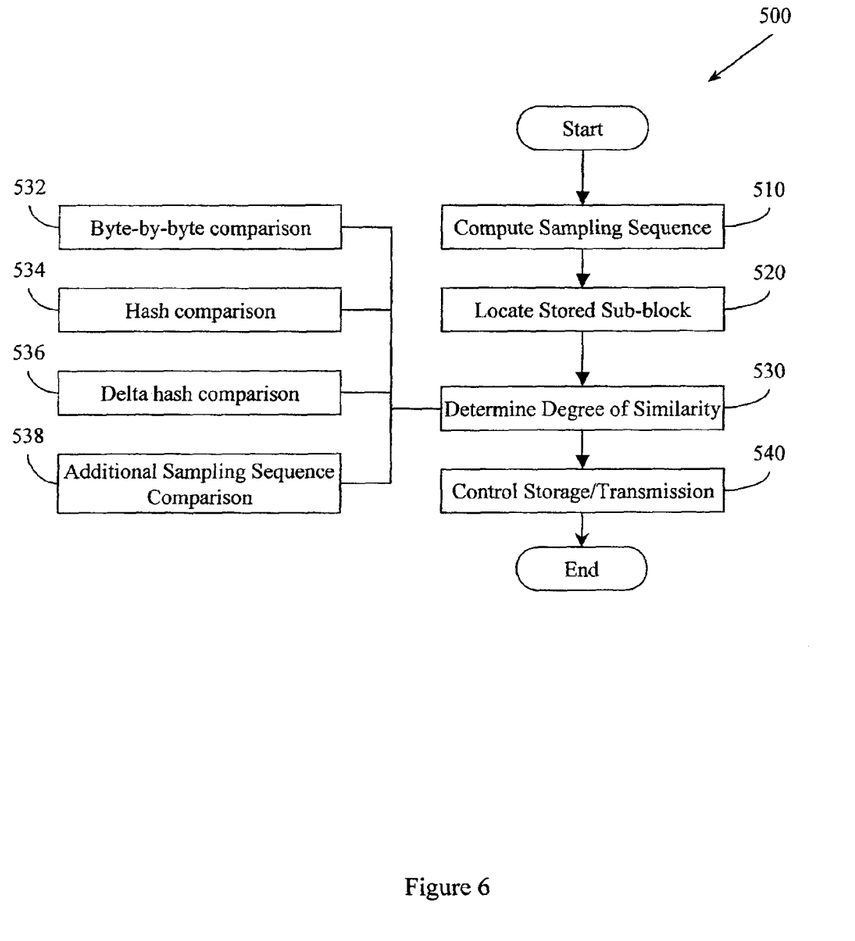
FIG. 6 illustrates additional detail for aspects of a method associated with sampling based data de-duplication.

FIG. 6 illustrates additional detail for action 530 in method 500. The additional detail illustrates different approaches for determining the degree of similarity. In one embodiment the degree of similarity can be computed at 532 using a byte-by-byte comparison between at least a portion of the sub-block and at least a portion of the stored sub-block. Multiple byte-by-byte comparisons can occur in parallel. The multiple comparisons may start at the different sampling locations where matches occurred.

The degree of similarity can also be computed at 534 by comparing a hash of at least a portion of the sub-block to a hash of at least a portion of the stored sub-block. In one embodiment, rather than store the hashes in a hash-based index, the hashes can be computed on the fly, used for the comparison, and then discarded. Once again, multiple hashes may be computed and compared in parallel.

The degree of similarity can also be computed at 536 by comparing a delta hash associated with at least a portion of the sub-block to a delta hash associated with at least a portion of the stored sub-block. Delta hashes can be localized to different locations and may in turn be used to initiate yet another tier of similarity processing. A delta hash may indicate a region in the sub-block where there are many differences and a region where there are few, if any, differences. The two different regions may then be processed differently.

The degree of similarity can also be computed at 538 by comparing one or more additional sampling sequences associated with the sub-block to one or more additional sampling sequences associated with the stored sub-block. The additional sampling sequences may be longer, may be shorter, may be biased to a different region of the sub-block (e.g., front, back), may use larger sized sampling points, and so on.

In different examples, two or more of, the byte-by-byte comparison at 532, comparing hashes at 534, comparing delta hashes at 536, and comparing additional sampling sequences at 538 are performed in parallel with each other. Additionally, two or more byte-by-byte comparisons at 532 may proceed in parallel, as can the actions at 534, 536, and 538.

Figure 7:
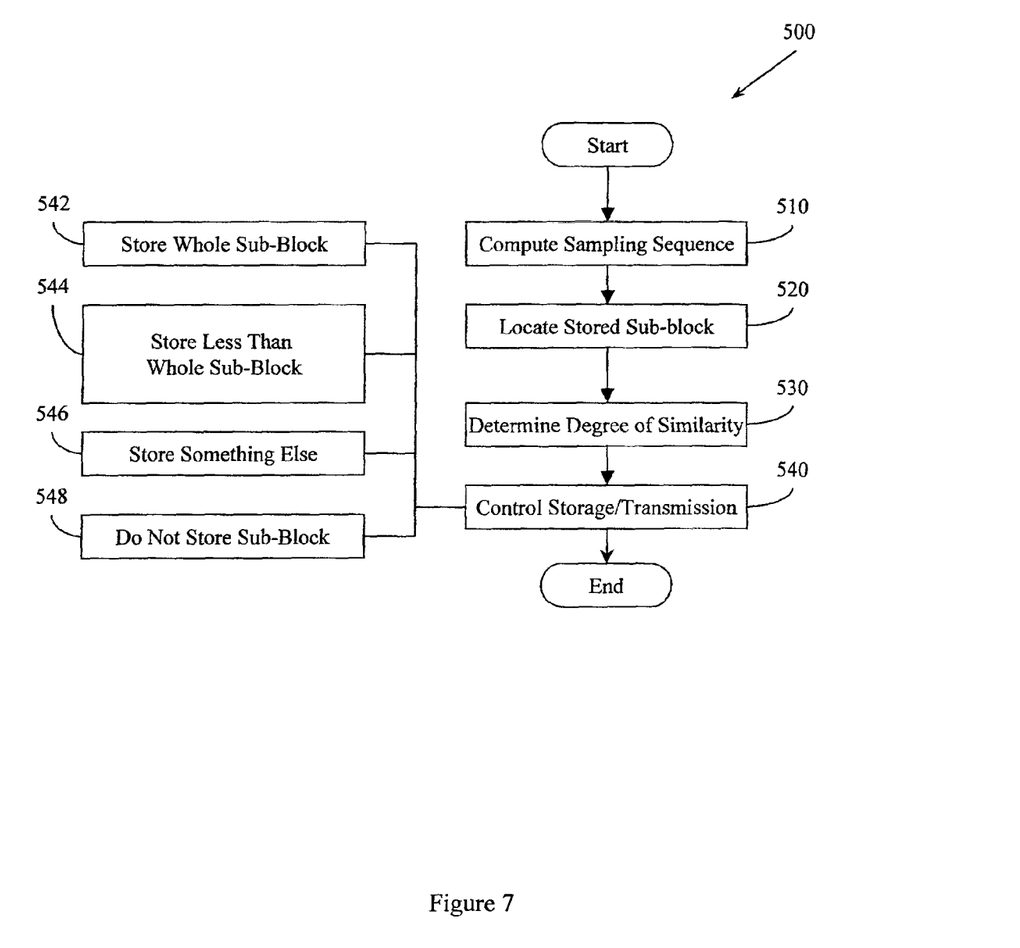
FIG. 7 illustrates additional detail for aspects of a method associated with sampling based data de-duplication.

FIG. 7 illustrates additional detail for action 540 in method 500. The additional detail illustrates different approaches for controlling whether and how the data de-duplication computer stores the sub-block. In one embodiment, the control includes, at 542, controlling the data de-duplication computer to store the whole sub-block upon determining that the sub-block is a non-duplicate sub-block that does not satisfy a similarity threshold. In some instances, storing the sub-block will also involve updating a similarity sampling sequence data structure (e.g., index) but in other instances the sub-block may be stored without updating the data structure. Instead, the sub-block may be positioned in a location where it can be found by association to other similarly situated sub-blocks. The set of similarly situated sub-blocks may be found in the future by finding an entry point to the set and then examining the set from that entry point.

In another example, the control can include, at 544, causing the de-duplication computer to store less than the whole sub-block. This may occur upon determining that the sub-block is a non-duplicate sub-block that satisfies the similarity threshold. Since the sub-block satisfies a similarity threshold, it may be possible to recreate the sub-block by only storing, for example, a reference to the sub-block it is similar to and the data that is different between the blocks.

In another example, the control can include, at 546, storing something other than the sub-block from which the sub-block can be recreated. This approach may be taken upon determining that the sub-block is a non-duplicate sub-block that satisfies the similarity threshold. This may take the form of, for example, storing a delta block.

In another example, the control can include, at 548, not storing the sub-block. There may be different rationale for not storing the sub-block. In one example, the sub-block may not be stored upon determining that the sub-block is a duplicate. In another example, the sub-block may not be stored upon determining that the sub-block is a non-duplicate sub-block, that the sub-block satisfies a second similarity threshold, and that the sub-block is associated with data for which a threshold number of errors are acceptable. For example, in a real-time gaming situation, it may not matter whether a certain block of data representing, for example, background and/or peripheral graphics, is displayed exactly correctly, as long as it is displayed in a manner that is acceptable. Therefore, rather than storing and transmitting similar acceptable blocks, one "default" block that satisfies several situations may be stored and/or transmitted and then displayed in place of many other sub-blocks.

The control at 540 may also include controlling whether a sub-block is transmitted between computers, processes, and other entities. Therefore, the control at 540 can also include controlling the data de-duplication computer to perform one of: transmitting the whole sub-block upon determining that the sub-block is a non-duplicate sub-block that does not satisfy a similarity threshold; transmitting less than the whole sub-block upon determining that the sub-block is a non-duplicate sub-block that satisfies the similarity threshold; transmitting something other than the sub-block from which the sub-block can be recreated upon determining that the sub-block is a non-duplicate sub-block that satisfies the similarity threshold, and not transmitting the sub-block.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

"Computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an ASIC, a CD (compact disk), other optical medium, a RAM (random access memory), a ROM (read only memory), a memory chip or card, a memory stick, and other media from which a computer, a processor, or other electronic device can read.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

While example apparatus, methods, and articles of manufacture have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

All elements, parts and steps described herein are preferably included. It is to be understood that any of these elements, parts and steps may be replaced by other elements, parts and steps or deleted altogether as will be obvious to those skilled in the art.

Broadly, this writing discloses example apparatus, methods, and computers performing sampling based data de-duplication. One example method controls a data de-duplication computer to compute a sampling sequence for a sub-block of data and to use the sampling sequence to locate a stored sub-block known to the data de-duplication computer. Upon finding a stored sub-block to compare to, the method includes controlling the data de-duplication computer to determine a degree of similarity (e.g., duplicate, very similar, somewhat similar, very dissimilar, completely dissimilar, x % similar) between the sub-block and the stored sub-block and to control whether and how the sub-block is stored and/or transmitted based on the degree of similarity. The degree of similarity can also control whether and how the data de-duplication computer updates a dedupe data structure(s) that stores information for finding groups of similarity sampling sequence related sub-blocks.

CONCEPTS

This writing has disclosed at least the following concepts.
Concept 1. An apparatus, comprising:
  a processor;
  a memory; and
  an interface to connect the processor, memory, and a set of logics, the set of logics comprising:
  a sampling sequence logic configured to produce a sampling sequence for a sub-block of data;
  a similarity logic configured to determine a degree of similarity between the sub-block and a previously de-duplicated sub-block based, at least in part, on the sampling sequence; and
  a control logic configured to control whether and how the sub-block is de-duplicated based on the degree of similarity.
Concept 2. The apparatus of Concept 1, where the sampling sequence logic is configured to produce the sampling sequence by aggregating data sampled from one or more sampling locations in the sub-block of data, where a data sample comprises one or more bits of data, where different data samples may have different bit lengths, and where the one or more sampling locations are less than all the possible locations in the sub-block.
Concept 3. The apparatus of Concept 1, where the similarity logic is configured to determine the degree of similarity by:
  locating information identifying a set of stored sub-blocks using the sampling sequence;

comparing the sub-block to a stored sub-block in the set of stored sub-blocks based, at least in part, on one or more of, a byte-wise comparison, additional sampling sequence comparison, delta hash comparison, and hash comparison.

Concept 4. The apparatus of Concept 1, where the control logic is configured:

to selectively control the apparatus to store one or more of, the sub-block of data, and a delta chunk sufficient to recreate the sub-block of data, and to selectively control the apparatus to update one or more of, a sampling sequence index, and a data structure that provides access to sampling sequence related stored sub-blocks.

Concept 5. A method for controlling a data de-duplication computer, comprising:

controlling the data de-duplication computer to compute a sampling sequence for a sub-block of data;

controlling the data de-duplication computer to use the sampling sequence to locate a stored sub-block known to the data de-duplication computer;

controlling the data de-duplication computer to determine a degree of similarity between the sub-block and the stored sub-block; and based on the degree of similarity, controlling one or more of:

whether the data de-duplication computer stores the sub-block;

how the data de-duplication computer stores the sub-block;

whether the data de-duplication computer transmits the sub-block;

how the data de-duplication computer transmits the sub-block;

whether the data de-duplication computer updates a dedupe data structure; and how the data de-duplication computer updates a dedupe data structure.

Concept 6. The method of Concept 5, where the sampling sequence comprises one or more pieces of data selected from one or more locations in the sub-block.

Concept 7. The method of Concept 5, where the sampling sequence comprises a weak hash computed from less than all the data in the sub-block.

Concept 8. The method of Concept 5, where the one or more pieces of data are the same length.

Concept 9. The method of Concept 5, where controlling the data de-duplication computer to use the sampling sequence to locate a stored sub-block comprises locating an entry point to a set of sampling sequence related sub-blocks.

Concept 10. The method of Concept 9, where the entry point is identified in a sampling sequence keyed index.

Concept 11. The method of Concept 10, where the sampling sequence keyed index has a maximum size bounded by the number of the one or more locations sampled and an alphabet associated with the sub-block of data, and where the maximum size is less than the amount of physical memory in the data de-duplication computer.

Concept 12. The method of Concept 5, where the degree of similarity is determined by one or more of:

a byte-by-byte comparison between at least a portion of the sub-block and at least a portion of the stored sub-block;

comparing a hash of at least a portion of the sub-block to a hash of at least a portion of the stored sub-block;

comparing a delta hash associated with at least a portion of the sub-block to a delta hash associated with at least a portion of the stored sub-block; and comparing one or more additional sampling sequences associated with the sub-block to one or more additional sampling sequences associated with the stored sub-block.

Concept 13. The method of Concept 12, where two or more of, the byte-by-byte comparison, comparing hashes, comparing delta hashes, and comparing additional sampling sequences are performed in parallel.

Concept 14. The method of Concept 5, comprising:

controlling the data de-duplication computer to select one or more of, a number of locations to be sampled when computing the sampling sequence, the positions of locations to be sampled when computing the sampling sequence, and the sizes of samples to be taken at locations to be sampled when computing the sampling sequence.

Concept 15. The method of Concept 14, where one or more of, the number of locations to be sampled, the position of locations to be sampled, and the sizes of samples to be taken is determined based on one or more of, whether an entropy measure associated with the sub-block exceeds an entropy threshold, whether a sub-block size associated with the sub-block exceeds a size threshold, and whether the sub-block was chunked using fixed boundaries or data dependant boundaries.

Concept 16. The method of Concept 14, comprising:

selectively dynamically altering one or more of, a number of locations to be sampled when computing the sampling sequence, the positions of locations to be sampled when computing the sampling sequence, and the sizes of samples taken at locations to be sampled when computing the sampling sequence based on one or more of, whether an entropy measure associated with the sub-block exceeds an entropy threshold, whether a sub-block size associated with the sub-block exceeds a size threshold, and whether the sub-block was chunked using fixed boundaries or data dependant boundaries.

Concept 17. The method of Concept 5, where controlling how the data de-duplication computer stores the sub-block comprises controlling the data de-duplication computer to perform one of:

storing the whole sub-block upon determining that the sub-block is a non-duplicate sub-block that does not satisfy a similarity threshold;

storing less than the whole sub-block upon determining that the sub-block is a non-duplicate sub-block that satisfies the similarity threshold;

storing something other than the sub-block from which the sub-block can be recreated upon determining that the sub-block is a non-duplicate sub-block that satisfies the similarity threshold;

not storing the sub-block upon determining that the sub-block is a duplicate; and not storing the sub-block upon determining that the sub-block is a non-duplicate sub-block, that the sub-block satisfies a second similarity threshold, and that the sub-block is associated with data for which a threshold number of errors are acceptable.

Concept 18. The method of Concept 5, where controlling how the data de-duplication computer transmits the sub-block comprises controlling the data de-duplication computer to perform one of:

transmitting the whole sub-block upon determining that the sub-block is a non-duplicate sub-block that does not satisfy a similarity threshold;

transmitting less than the whole sub-block upon determining that the sub-block is a non-duplicate sub-block that satisfies the similarity threshold;

transmitting something other than the sub-block from which the sub-block can be recreated upon determining that the sub-block is a non-duplicate sub-block that satisfies the similarity threshold;

not transmitting the sub-block upon determining that the sub-block is a duplicate; and not transmitting the sub-block upon determining that the sub-block is a non-duplicate sub-block, that the sub-block satisfies a second similarity threshold, and that the sub-block is associated with data for which a threshold number of errors are acceptable.

Concept 19. The method of Concept 5, where controlling how the data de-duplication computer updates one or more data structures used for locating the stored sub-block comprises controlling the data de-duplication computer to perform one of:

updating a sampling sequence based index that stores entry points to groups of sampling sequence related stored sub-blocks;

updating a temporal index that stores information about known sub-blocks that are related by one or more of, arrival sequence, de-duplication sequence, and physical storage location;

updating a sampling sequence based tree that stores one or more of, information about known sampling sequence related stored blocks and entry points to groups of sampling sequence related stored sub-blocks;

updating a sampling sequence based list that stores one or more of, information about known sampling sequence related stored blocks and entry points to groups of sampling sequence related stored sub-blocks; and updating a sampling sequence based graph that stores one or more of, information about known sampling sequence related stored blocks and entry points to groups of sampling sequence related stored sub-blocks.

Concept 20. The method of Concept 5, comprising:

controlling the data de-duplication computer to compute a sampling sequence for two or more sub-blocks of data and to aggregate the two or more sampling sequences into a single sampling sequence; and controlling the data de-duplication computer to use the aggregated sampling sequence to locate a stored sub-block known to the data de-duplication computer.

Concept 21. The method of Concept 5, comprising:

controlling the data de-duplication computer to compute two or more different sampling sequences for the sub-block;

controlling the data de-duplication computer to locate two or more stored sub-blocks known to the data de-duplication computer, where the locating is based on the two or more different sampling sequences; and controlling the data de-duplication computer to determine degrees of similarity between the sub-block and the two or more stored sub-blocks.

Concept 22. The method of Concept 21, comprising:

controlling the data de-duplication computer to compute the two or more different sampling sequences for the sub-block at least partially in parallel;

controlling the data de-duplication computer to locate the two or more stored sub-blocks at least partially in parallel; and controlling the data de-duplication computer to determine the degrees of similarity at least partially in parallel.

Concept 23. A non-transitory computer-readable medium storing computer-executable instructions that when executed control a data de-duplication computer to perform a method, the method comprising:

controlling the data de-duplication computer to compute a sampling sequence for a sub-block of data;

controlling the data de-duplication computer to use the sampling sequence to locate a stored sub-block known to the data de-duplication computer;

controlling the data de-duplication computer to determine a degree of similarity between the sub-block and the stored sub-block; and based on the degree of similarity, controlling one or more of:

whether the data de-duplication computer stores the sub-block;

how the data de-duplication computer stores the sub-block;

whether the data de-duplication computer transmits the sub-block;

how the data de-duplication computer transmits the sub-block;

whether the data de-duplication computer updates a dedupe data structure; and how the data de-duplication computer updates a dedupe data structure.

The invention claimed is:

1. A method for controlling a data de-duplication computer to selectively store or transmit a sub-block of data based on sub-block level sampling-based de-duplication, comprising:

controlling the data de-duplication computer to select a number of locations in the sub-block to be sampled and positions for the locations to be sampled, where the selecting is based on one or more of whether an entropy measure associated with the sub-block exceeds an entropy threshold, whether a sub-block size associated with the sub-block exceeds a size threshold, and whether the sub-block was chunked using fixed boundaries or data dependent boundaries;

controlling the data de-duplication computer to compute a sampling sequence for the sub-block of data, where the sampling sequence comprises data from the selected number of locations at the selected positions in the sub-block;

controlling the data de-duplication computer to use the sampling sequence to locate a stored sub-block known to the data de-duplication computer, comprising locating an entry point to a set of sampling sequence related sub-blocks, where the entry point is identified in a sampling sequence keyed index;

controlling the data de-duplication computer to determine a degree of similarity between the sub-block and the stored sub-block, where the degree of similarity is determined by one or more of:

comparing a hash of at least a portion of the sub-block to a hash of at least a portion of the stored sub-block;

comparing a delta hash associated with at least a portion of the sub-block to a delta hash associated with at least a portion of the stored sub-block; and comparing one or more additional sampling sequences associated with the sub-block to one or more additional sampling sequences associated with the stored sub-block;

and based on the degree of similarity, controlling:

whether the data de-duplication computer stores the sub-block and, when the sub-block is to be stored, identifying a storage format for the sub-block and controlling the data de-duplication computer to store the sub-block according to the identified storage format;

whether the data de-duplication computer transmits the sub-block and, when the sub-block is to be transmitted, identifying a transmission procedure for the sub-block and controlling the data de-duplication computer to transmit the sub-block according to the identified transmission procedure;

whether the data de-duplication computer updates a dedupe data structure and, when the dedupe structure is to be updated, identifying how the data de-duplication computer is to update the dedupe data structure and controlling the data de-duplication computer to update the dedupe data structure; and whether the data de-duplication computer updates the sampling sequence keyed index and, when the sampling sequence keyed index is to be updated, identifying how the data de-duplication computer is to update the sampling sequence keyed index and controlling the data de-duplication computer to update the sampling sequence keyed index.

2. The method of claim 1, where the sampling sequence comprises a weak hash computed from less than all the data in the sub-block.

3. The method of claim 1, where the sampling sequence keyed index has a maximum size bounded by the number of the one or more locations sampled and an alphabet associated with the sub-block of data, and where the maximum size is less than the amount of physical memory in the data de-duplication computer.

4. The method of claim 1, wherein said degree of similarity is determined performing two or more of comparing a hash, comparing a delta hash, and comparing one or more additional sampling sequences in parallel.

5. The method of claim 1, comprising:
selectively dynamically altering one or more of the number of locations to be sampled, and the positions of locations to be sampled, based on one or more of whether an entropy measure associated with the sub-block exceeds an entropy threshold, whether a sub-block size associated with the sub-block exceeds a size threshold, and whether the sub-block was chunked using fixed boundaries or data dependant boundaries.

6. The method of claim 1, where said controlling whether the data de-duplication computer stores the sub-block and, when the sub-block is to be stored, identifying a storage format for the sub-block and controlling the data de-duplication computer to store the sub-block according to the identified storage format comprises controlling the data de-duplication computer to perform one of:
storing the whole sub-block upon determining that the sub-block is a non-duplicate sub-block that does not satisfy a similarity threshold;
storing less than the whole sub-block upon determining that the sub-block is a non-duplicate sub-block that satisfies the similarity threshold;
storing something other than the sub-block from which the sub-block can be recreated upon determining that the sub-block is a non-duplicate sub-block that satisfies the similarity threshold;
not storing the sub-block upon determining that the sub-block is a duplicate; and
not storing the sub-block upon determining that the sub-block is a non-duplicate sub-block, that the sub-block satisfies a second similarity threshold, and that the sub-block is associated with data for which a threshold number of errors are acceptable.

7. The method of claim 1, where said controlling whether the data de-duplication computer transmits the sub-block and, when the sub-block is to be transmitted, identifying a transmission procedure for the sub-block and controlling the data de-duplication computer to transmit the sub-block according to the identified transmission procedure comprises controlling the data de-duplication computer to perform one of:
transmitting the whole sub-block upon determining that the sub-block is a non-duplicate sub-block that does not satisfy a similarity threshold;
transmitting less than the whole sub-block upon determining that the sub-block is a non-duplicate sub-block that satisfies the similarity threshold;
transmitting something other than the sub-block from which the sub-block can be recreated upon determining that the sub-block is a non-duplicate sub-block that satisfies the similarity threshold;
not transmitting the sub-block upon determining that the sub-block is a duplicate; and
not transmitting the sub-block upon determining that the sub-block is a non-duplicate sub-block, that the sub-block satisfies a second similarity threshold, and that the sub-block is associated with data for which a threshold number of errors are acceptable.

8. The method of claim 1, where controlling the data de-duplication computer to update the one or more data structures used for locating the stored sub-block comprises controlling the data de-duplication computer to perform one of:
updating a sampling sequence based index that stores entry points to groups of sampling sequence related stored sub-blocks;
updating a temporal index that stores information about known sub-blocks that are related by one or more of, arrival sequence, de-duplication sequence, and physical storage location;
updating a sampling sequence based tree that stores one or more of, information about known sampling sequence related stored blocks and entry points to groups of sampling sequence related stored sub-blocks;
updating a sampling sequence based list that stores one or more of, information about known sampling sequence related stored blocks and entry points to groups of sampling sequence related stored sub-blocks; and
updating a sampling sequence based graph that stores one or more of, information about known sampling sequence related stored blocks and entry points to groups of sampling sequence related stored sub-blocks.

9. The method of claim 1, comprising:
controlling the data de-duplication computer to compute a sampling sequence for two or more sub-blocks of data and to aggregate the two or more sampling sequences into a single sampling sequence; and
controlling the data de-duplication computer to use the aggregated sampling sequence to locate a stored sub-block known to the data de-duplication computer.

10. The method of claim 1, comprising:
controlling the data de-duplication computer to compute two or more different sampling sequences for the sub-block;
controlling the data de-duplication computer to locate two or more stored sub-blocks known to the data de-duplication computer, where the locating is based on the two or more different sampling sequences; and
controlling the data de-duplication computer to determine degrees of similarity between the sub-block and the two or more stored sub-blocks.

11. The method of claim 10, comprising:
controlling the data de-duplication computer to compute the two or more different sampling sequences for the sub-block at least partially in parallel;
controlling the data de-duplication computer to locate the two or more stored sub-blocks at least partially in parallel; and controlling the data de-duplication computer to determine the degrees of similarity at least partially in parallel.

12. A non-transitory computer-readable medium storing computer-executable instructions that when executed control a data de-duplication computer to perform the method of claim 1.

\* \* \* \* \*